Figure 1:
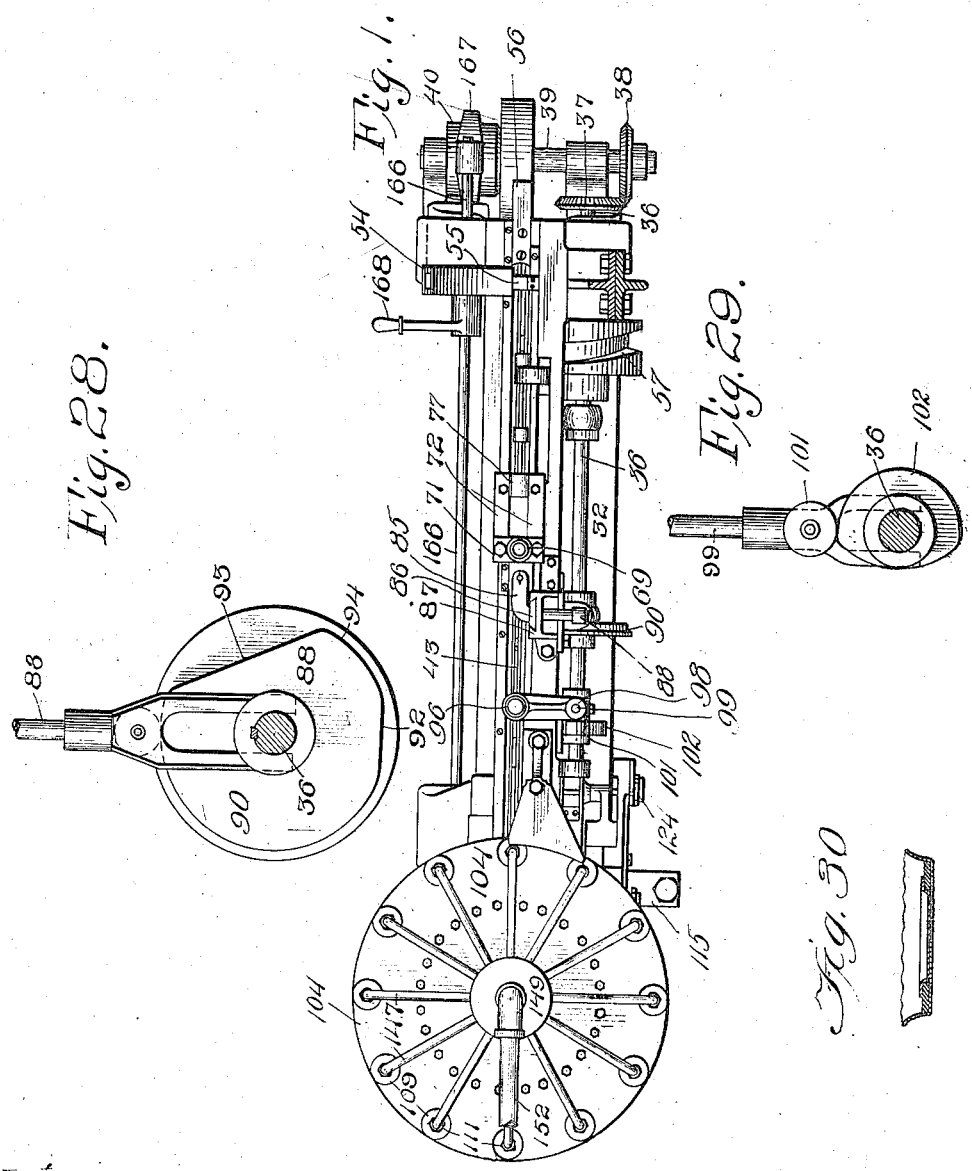

C. D. McDONALD.
MACHINE FOR POSITIONING AND SECURING GASKETS WITHIN METALLIC CAPS.
APPLICATION FILED JAN. 3, 1911.

1,013,842.

Patented Jan. 2, 1912.

12 SHEETS—SHEET 1.

C. D. McDONALD.
MACHINE FOR POSITIONING AND SECURING GASKETS WITHIN METALLIC CAPS.
APPLICATION FILED JAN. 3, 1911.

1,013,842.

Patented Jan. 2, 1912.
12 SHEETS—SHEET 2.

Witnesses:
Harry S. Gaither
Wm Bond

Inventor:
Charles D. McDonald
by Banning & Banning
Attys

C. D. McDONALD.
MACHINE FOR POSITIONING AND SECURING GASKETS WITHIN METALLIC CAPS.
APPLICATION FILED JAN. 3, 1911.

1,013,842.

Patented Jan. 2, 1912.

12 SHEETS—SHEET 4.

Witnesses:
Harry S. Gaither
W. M. Bond

Inventor,
Charles D. McDonald
by Banning & Banning
attys

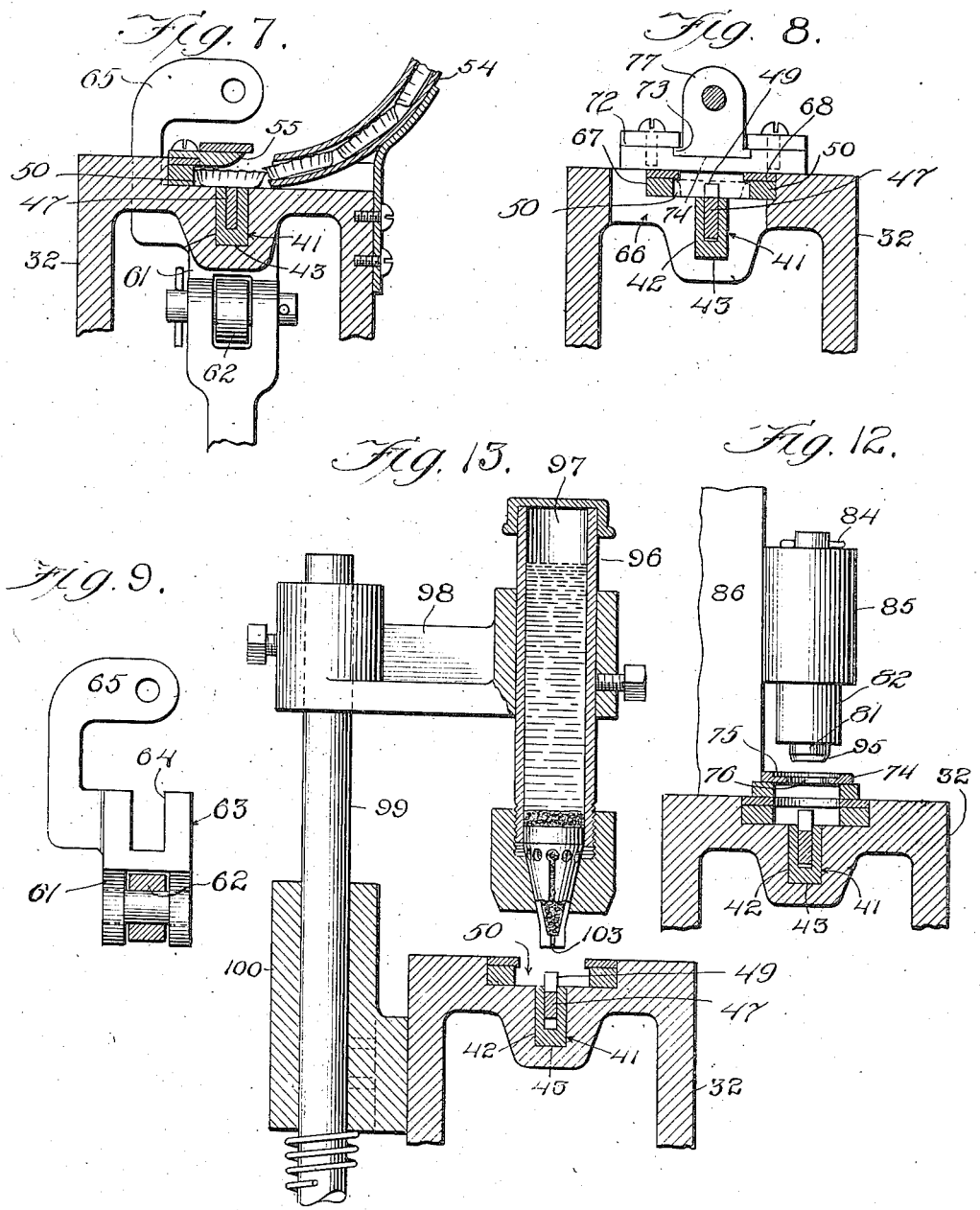

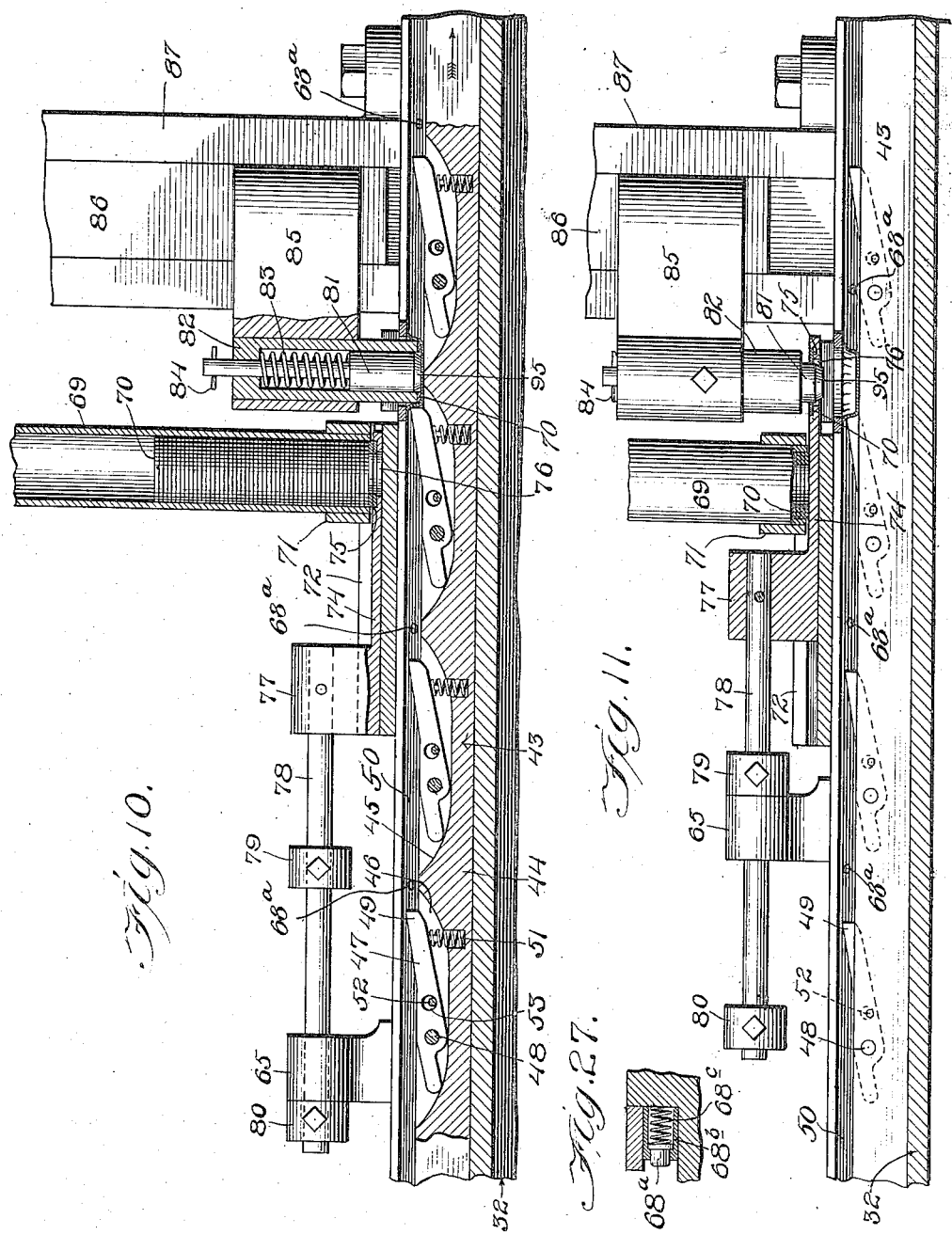

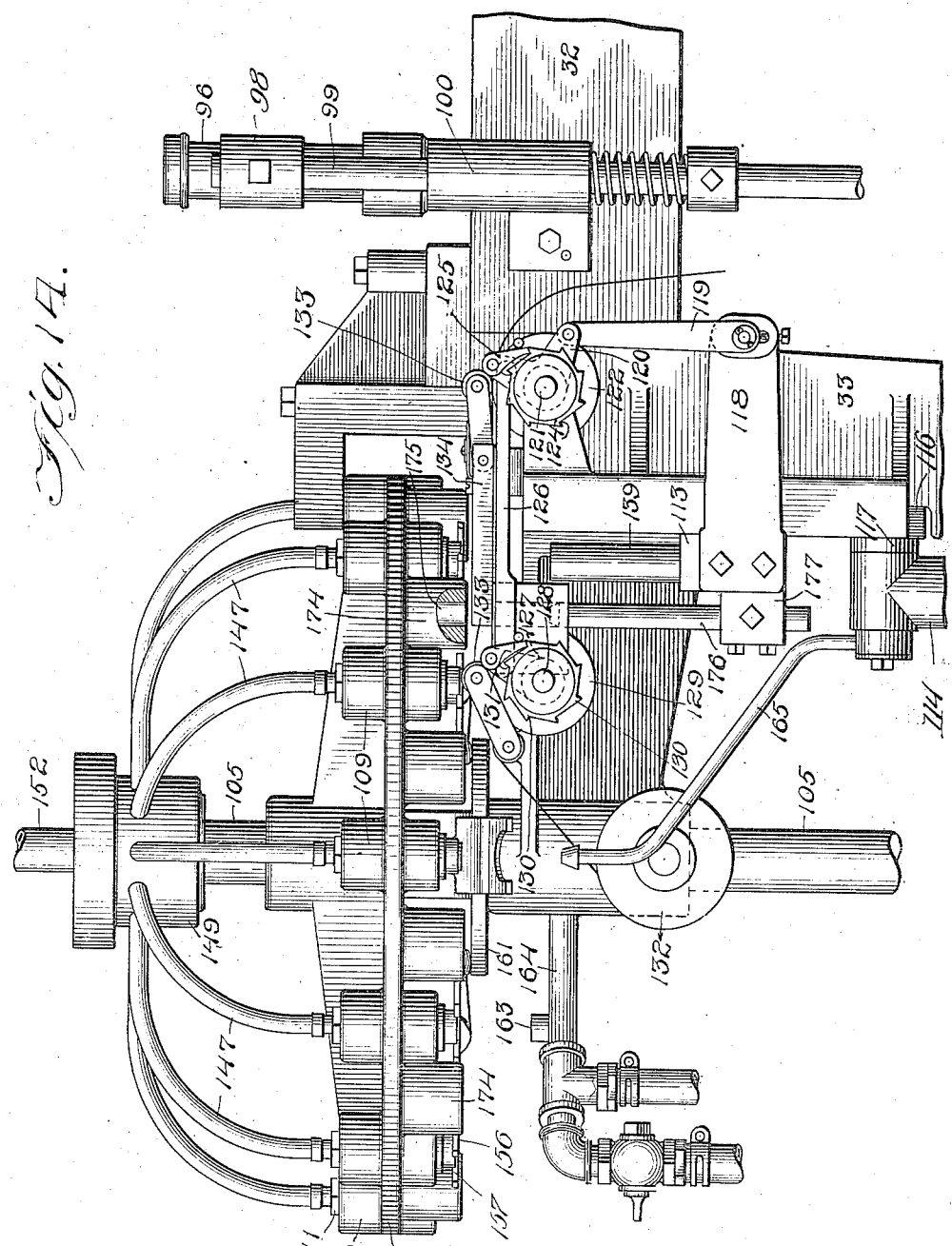

C. D. McDONALD.
MACHINE FOR POSITIONING AND SECURING GASKETS WITHIN METALLIC CAPS.
APPLICATION FILED JAN. 3, 1911.
1,013,842.
Patented Jan. 2, 1912.
12 SHEETS—SHEET 8.
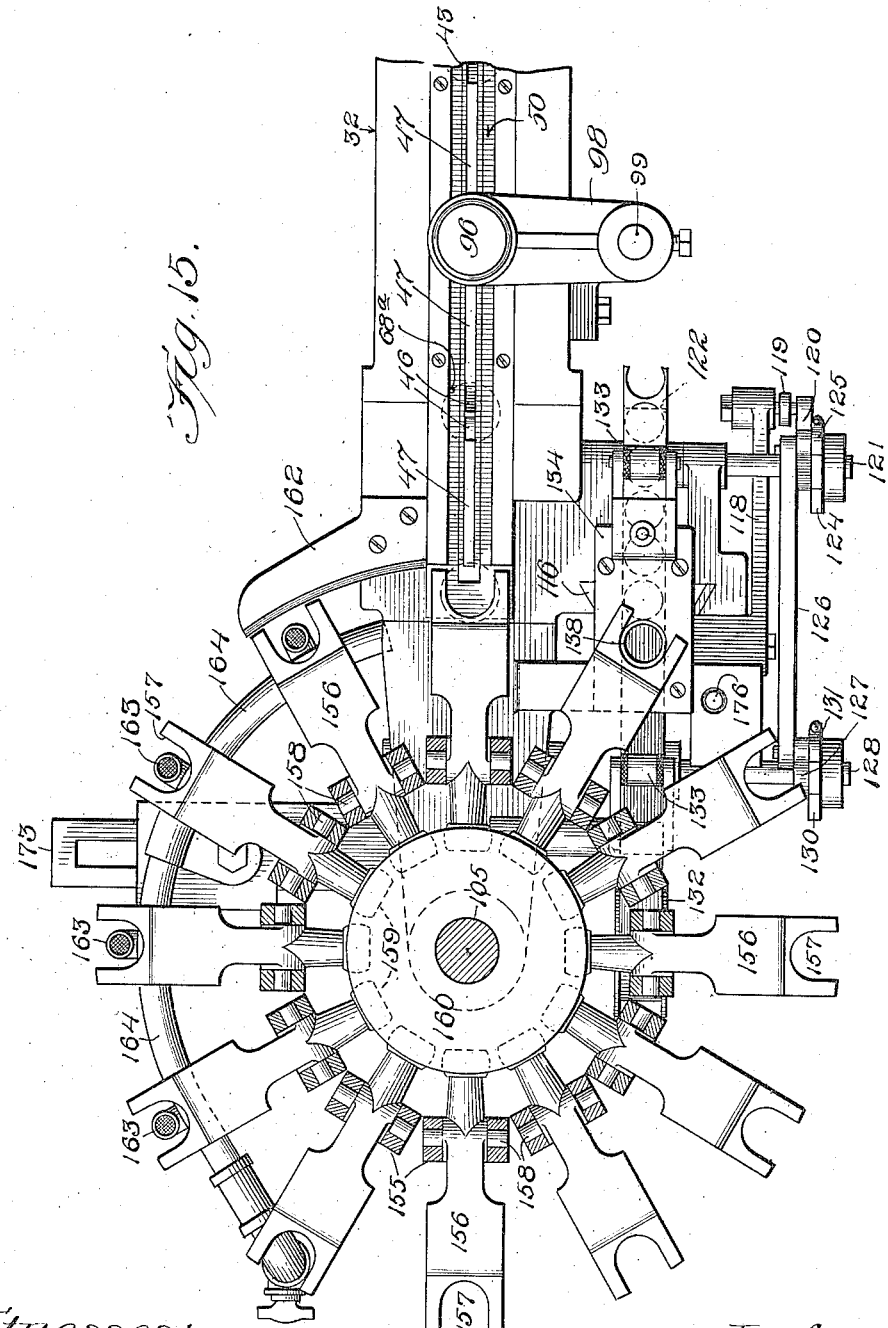

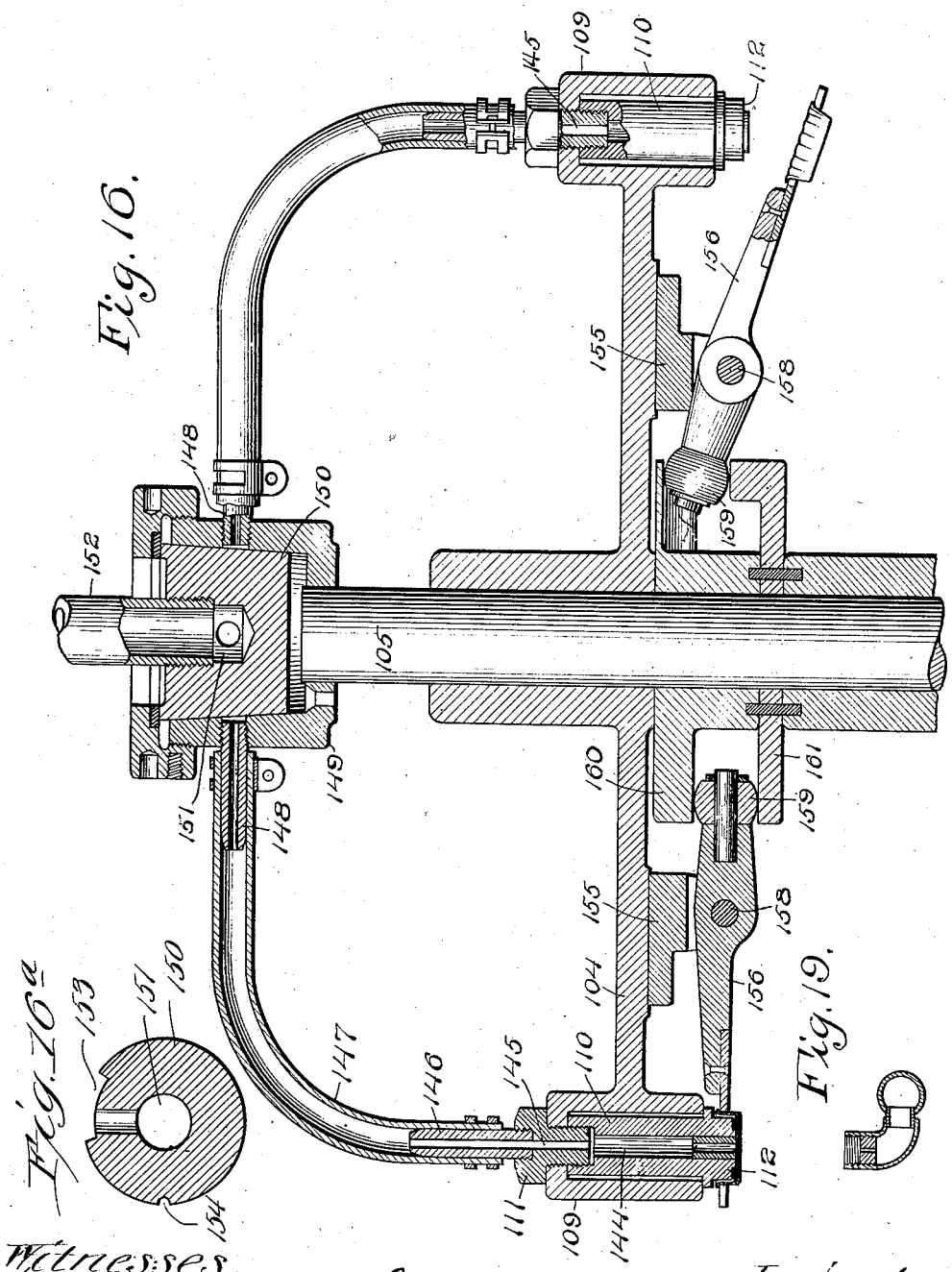

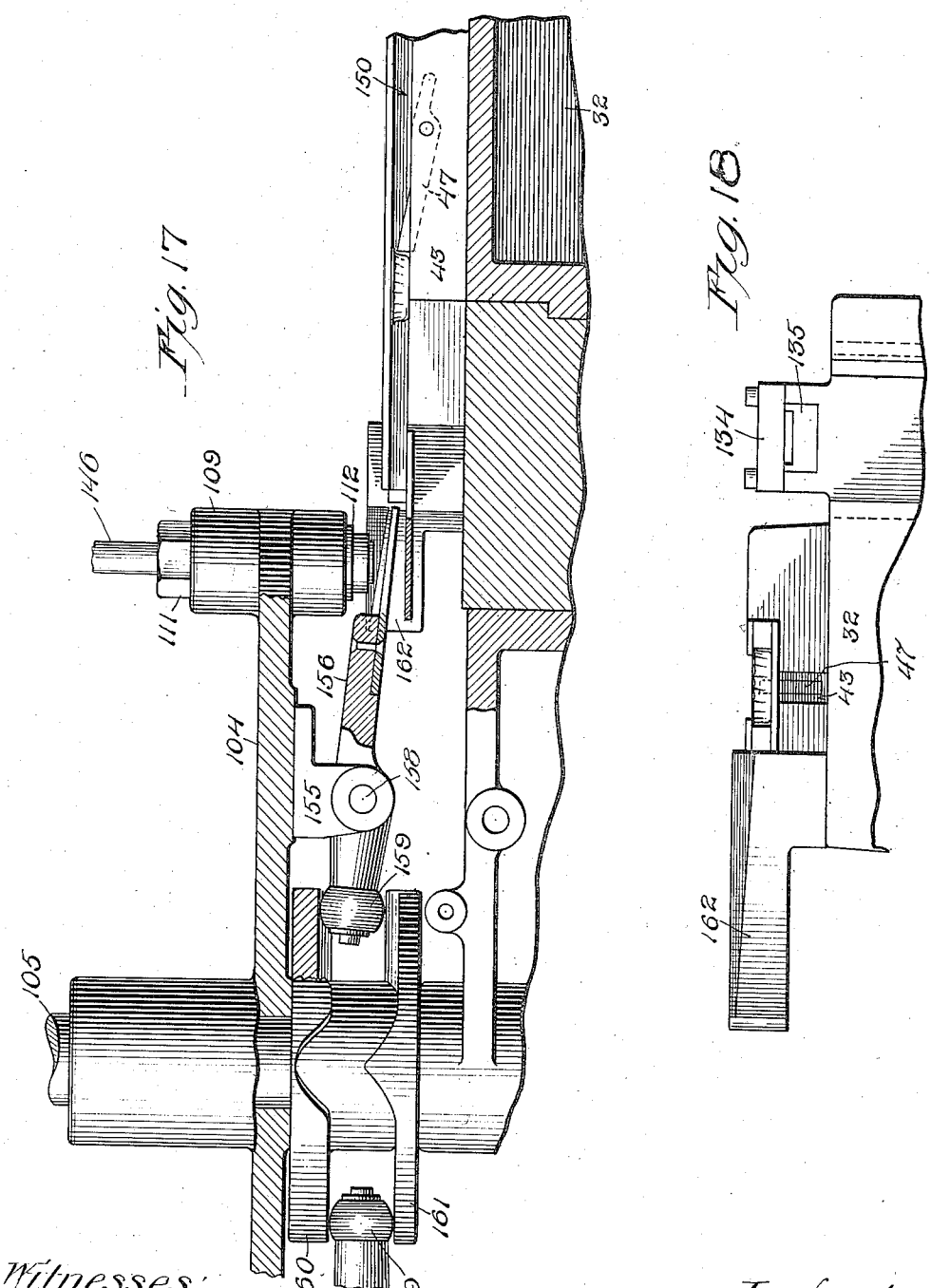

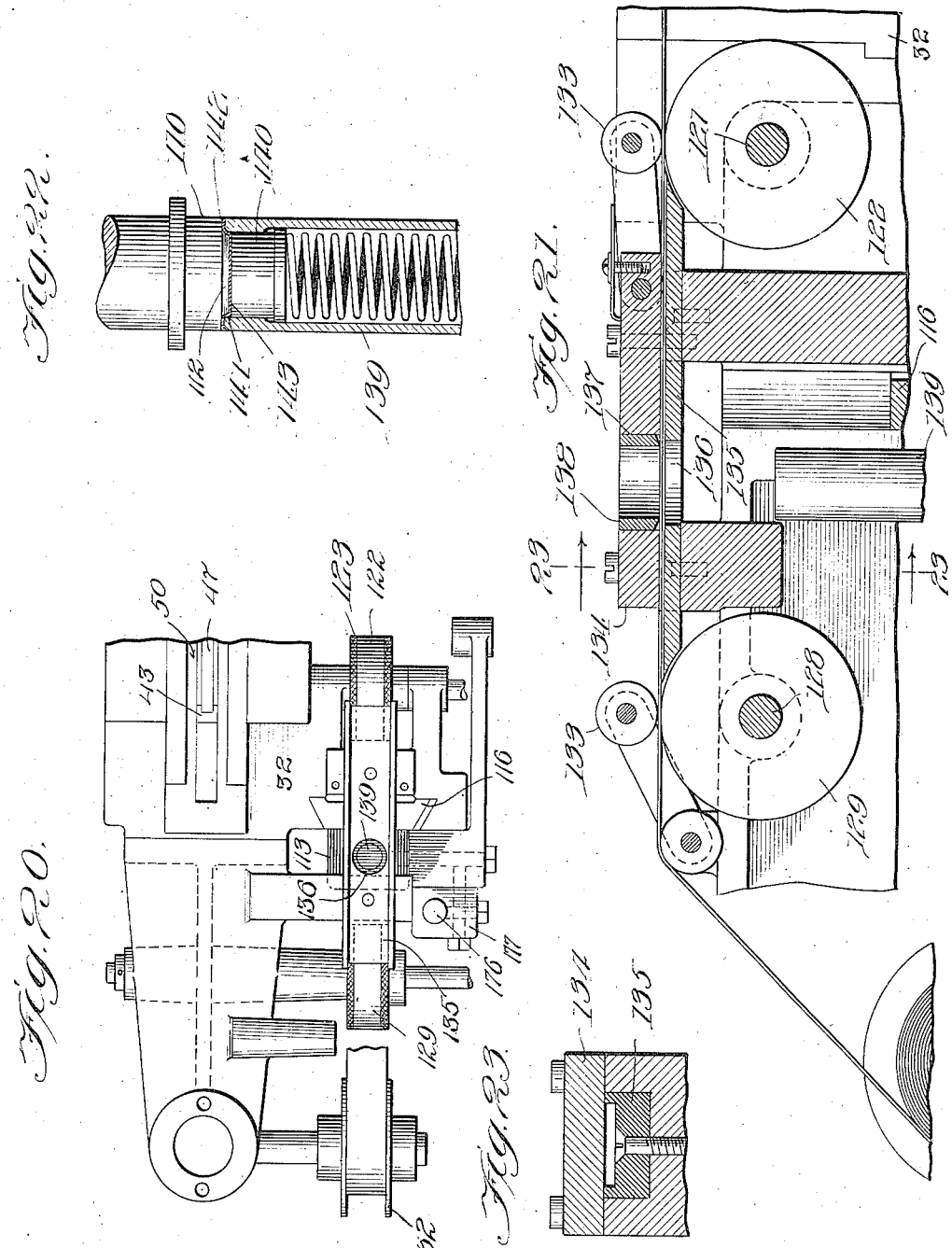

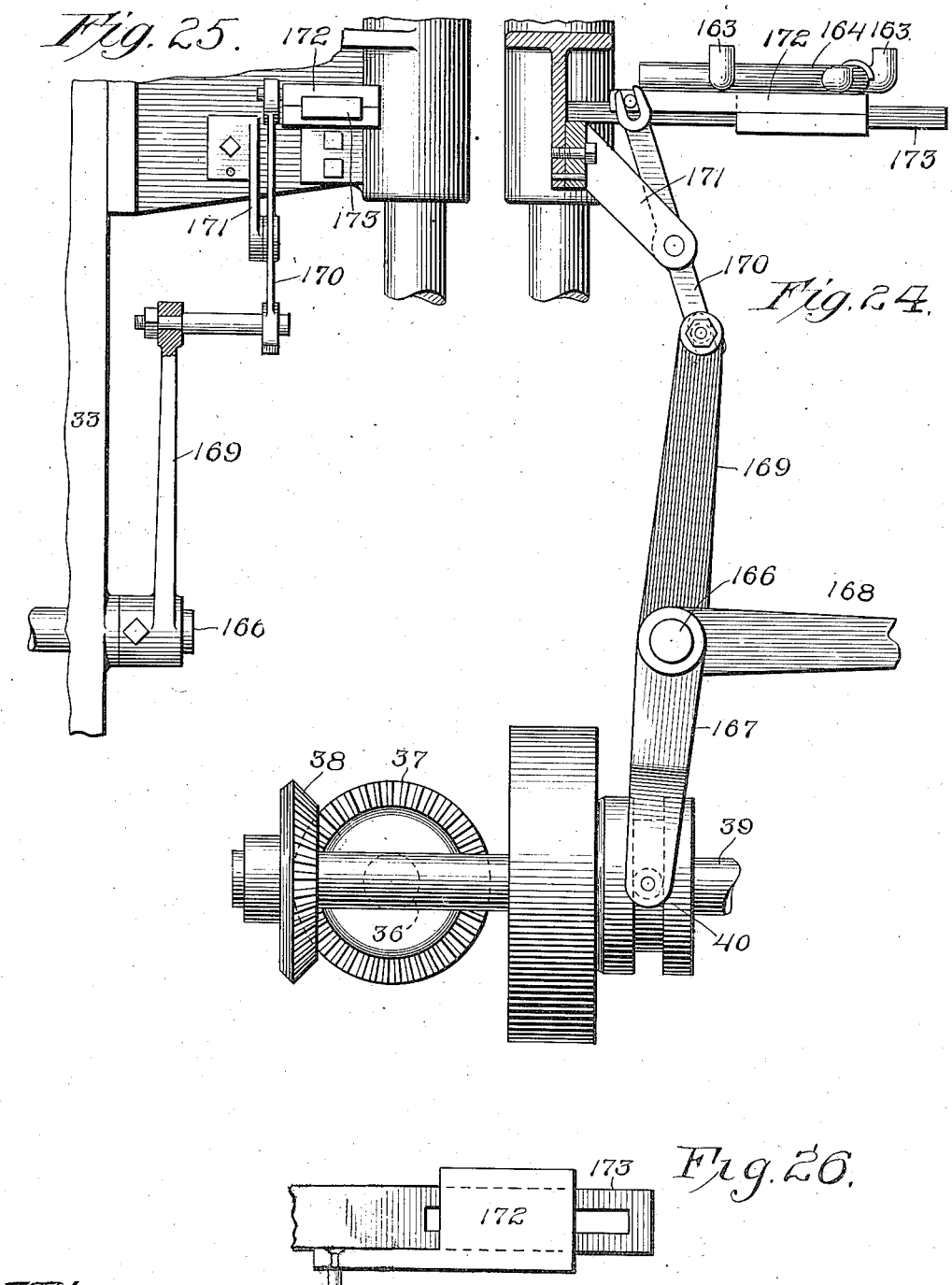

UNITED STATES PATENT OFFICE.

CHARLES D. McDONALD, OF CHICAGO, ILLINOIS, ASSIGNOR, BY MESNE ASSIGNMENTS, TO AMERICAN CORK & SEAL COMPANY, OF PHILADELPHIA, PENNSYLVANIA, A CORPORATION OF MAINE.

MACHINE FOR POSITIONING AND SECURING GASKETS WITHIN METALLIC CAPS.

1,013,842.  Specification of Letters Patent.  Patented Jan. 2, 1912.

Application filed January 3, 1911. Serial No. 600,542.

*To all whom it may concern:*

Be it known that I, CHARLES D. MCDONALD, a citizen of the United States, residing at Chicago, in the county of Cook and State of Illinois, have invented certain new and useful Improvements in Machines for Positioning and Securing Gaskets Within Metallic Caps, of which the following is a specification.

The present invention relates to a machine adapted to position a gasket of sealing substance within a metallic cap, and to form, place and secure a retainer for said gasket within the cap.

The objects of the present invention are, to provide a magazine adapted to receive a plurality of formed gaskets ready for positioning within a cap; to provide mechanism for intermittently discharging the caps from the magazine; to provide mechanism for feeding the caps in a rectilinear path of travel with an intermittent movement; to provide mechanism for transferring a gasket discharged from the magazine into position within the cap, said latter action occurring during the period of rest in the feeding of the cap; to provide means for placing a drop of acid in the cap and on that portion of the cap exposed by the opening in the gasket; to prevent the passage of more than one cap at a time from the magazine containing the caps into position to be engaged by the mechanism for feeding the caps; to provide a connection between the feeding mechanism and the mechanism for discharging the gaskets from the magazine and positioning them within the caps, whereby the operation of the feeding mechanism also operates the mechanism for positioning the gasket within the cap and for discharging the gaskets from the magazine; to provide a movable member which will receive the gasket bearing caps after they have been carried a predetermined distance by the feeding mechanism; to provide means for cutting out from a sheet of metal having a fusible surface a blank adapted to form a retainer for the gasket; to provide means for positioning this blank of metal upon that portion of the movable member upon which the gasket bearing caps are placed; to provide means whereby this positioning of the metal upon the movable member forms it into the necessary configuration to perform its functions as a retaining member; to place this formed retainer on the member prior to the installation of the gasket bearing cap thereon; to maintain said retainer in position upon said member until the installation of the gasket bearing cap thereon; to provide means for clamping the gasket bearing cap onto the member carrying the retainer; to provide means to prevent slippage of the gasket bearing cap out of position prior to its being clamped upon the member bearing the retaining member; to provide means for actuating said clamping member, whereby the gasket bearing cap is held in rigid engagement with the member bearing the retainer during a predetermined period of movement of the latter member, and the retaining member accurately positioned with respect to the gasket.

The invention further relates to means for exposing a portion of the cap during its conveyance by the member having the retainer thereon; and further objects are, to subject said exposed portion of the cap to the action of heat, whereby the fusible surface of the metal from which the retainer is formed is melted and the retainer is fixedly secured within the cap during the movement of the member carrying the retainer and the gasket bearing cap; to provide means for moving the mechanism for applying the heat, whereby heating of the cap may be eliminated during its carriage upon the movable member; to provide means for automatically releasing the clamping member from clamping position, and to automatically discharge the cap from engagement with the clamping member; and to provide a common drive shaft, the actuation of which will serve to actuate all of the mechanism constituting the apparatus for positioning and securing the gasket within the cap.

The invention further consists in the features of construction and the combination of parts hereinafter described and claimed.

Figure 2:
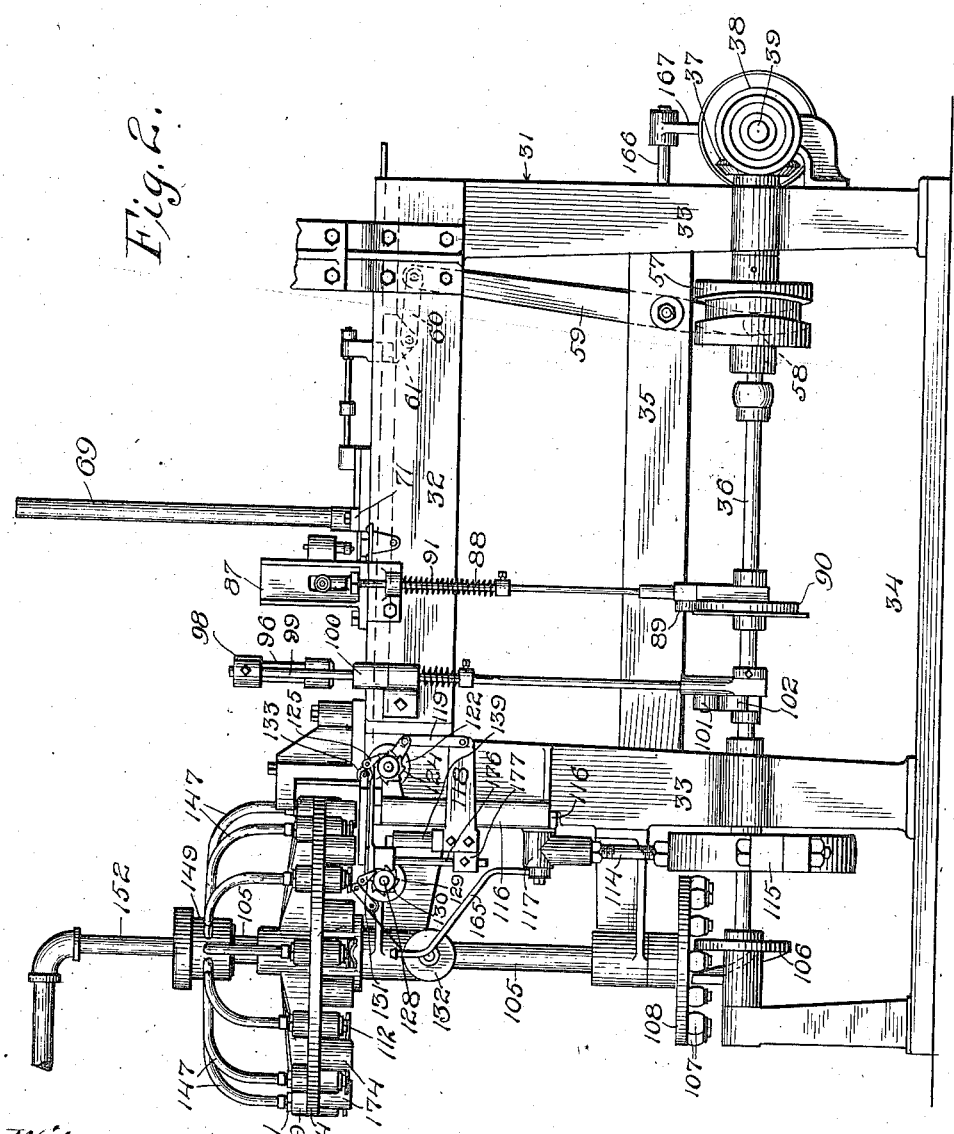
Figure 3:
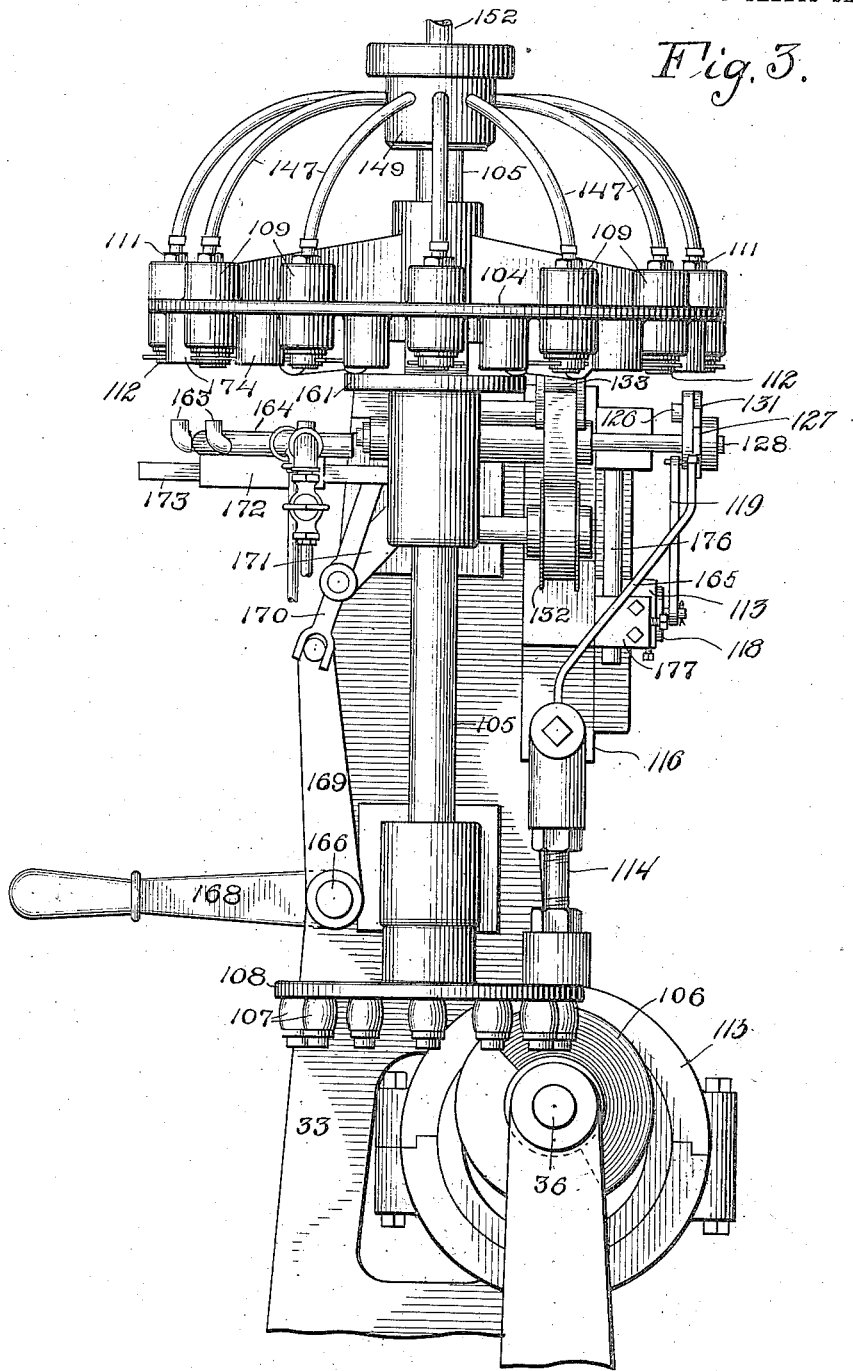
Figure 4:
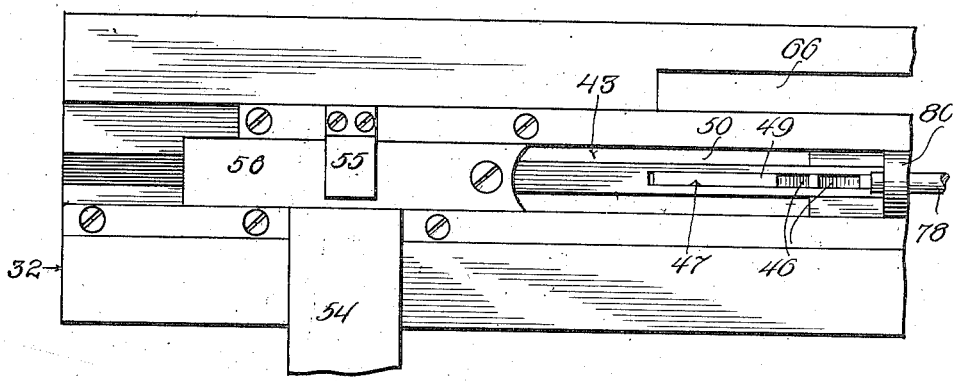
Figure 5:
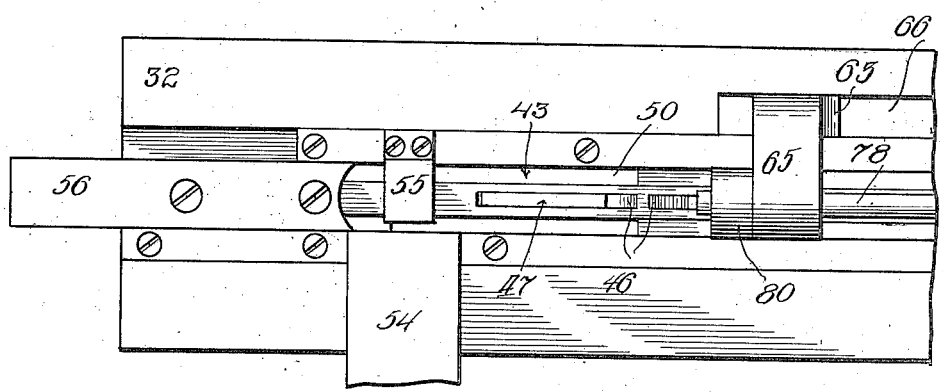
Figure 6:
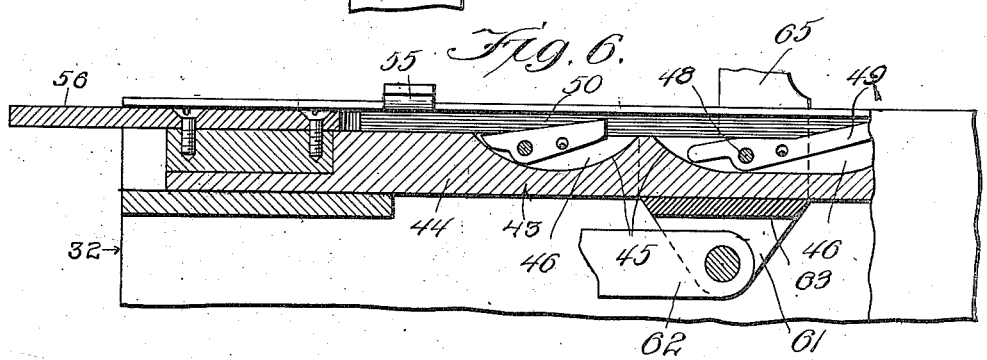

In the drawings, Figure 1 is a plan view of the complete machine; Fig. 2, a side elevation of the complete machine; Fig. 3, an end view of the complete machine, looking upon the end of the machine located to the left of Fig. 1; Fig. 4, a plan view showing, in its advanced position, the plate which forms the initial feed member for the cap;

Fig. 5, a view similar to Fig. 4, showing the plate in its retracted position; Fig. 6, a cross section of the parts shown in Figs. 4 and 5 in the position shown in Fig. 5; Fig. 7, a transverse section at the point where the caps pass from the delivery chute into position to be engaged by the feed member; Fig. 8, a cross section through the framework, showing the channel for the feed bar, the channel for the caps, and the rod for actuating the mechanism for discharging the gaskets from the magazine; Fig. 9, a detail of the member which forms the connection between the actuating means for the feed bar and the actuating means for the mechanism for discharging the gasket from the magazine; Fig. 10, an elevation partly in section, showing the feed bar, the mechanism for discharging the gaskets from the magazine, and the mechanism for placing the discharged gaskets within the cap, and showing the latter mechanism in the position it assumes when placing a gasket within the cap; Fig. 11, a view similar to Fig. 10, showing the member for positioning the gasket within the cap in the position which it assumes when receiving the gasket discharged from the magazine; Fig. 12, a detail showing the member for positioning the gasket within the cap in its normal position; Fig. 13, a detail of the mechanism for placing the acid within the cap; Fig. 14, an enlarged elevation of that portion of the mechanism for forming and placing the retainer for the gasket within the cap; Fig. 15, a plan view showing the clamping members for holding the cap in position upon the heads which carry the retaining members, also showing the relation between the burners for applying heat to the caps and the clamping members, and also showing the connection between the feed mechanism and the clamping members; Fig. 16, a sectional elevation showing the suction arrangement for holding the retaining members upon the heads prior to the insertion of the gasket bearing caps thereon, and also showing the clamping members in acting and non-acting position; Fig. 16ª, a cross section through the valve plug 150; Fig. 17, a sectional detail at the point of juncture of the feed mechanism and the clamping mechanism, showing the clamping mechanism in position to receive a cap from the feed mechanism; Fig. 18, a detail showing the plate for maintaining the cap in position upon the clamping member prior to the throwing of the clamping member into operative relation with respect to the head carrying the retainer; Fig. 19, a detail of the burner; Fig. 20, a plan view of the mechanism for feeding the strip of metal from which the retainers are formed, and the mechanism for cutting the blanks for the retainers from said strip; Fig. 21, an enlarged section through the mechanism for feeding the strip of metal; Fig. 22, a detail showing the dies for forming the retainer; Fig. 23, a section on line 23—23 of Fig. 21; Fig. 24, a detail showing the mechanism for moving the heating mechanism into and out of operative position, and showing the connection between said mechanisms and the clutch mechanism for controlling the operation of the entire machine; Fig. 25, a view of the parts shown in Fig. 24, turned at an angle of 90°; Fig. 26, a detail showing the sliding bar carrying the heating mechanism; Fig. 27, a detail of the mechanism for preventing return movement of the cap while it is being acted upon by the feed bar; Fig. 28, a detail of the cam for actuating the mechanism for placing the gasket within the cap; Fig. 29, a detail of the cam for actuating the mechanism for placing the acid within the cap; and Fig. 30, a sectional elevation of a cap with a completed seal in position therein.

The mechanism of the present invention is mounted upon a framework 31, which comprises an upper bed-plate 32 supported by suitable standards 33, mounted upon a base plate 34; and the standards 33 are reinforced, as shown, by suitable cross-supports 35. Journaled within the standards 33 is a main driving shaft 36 for the mechanism, and, as shown more clearly in Figs. 2 and 24, said shaft 36 has mounted on one end a beveled gear 37 meshing with a gear 38, the gear 38 being secured to a power driven shaft 39; and suitable shifting mechanism 40 is provided for throwing the gear 38 in and out of mesh with the gear 37 to control the stopping and starting of the machine.

The upper bed-plate 32 is provided with a T-shaped channel 41, the reduced portion 42 of said channel acting as a guideway for a feed bar 43, which extends longitudinally of the machine and is shown in detail in Figs. 10 and 11. The feed bar consists of a body portion 44, having its upper face formed with a series of concave surfaces 45, which provide a series of pockets or recesses 46 along the upper surface of the feed bar. Lying within each of these pockets or recesses is a finger 47, pivoted at 48, and having its acting end 49 held to normally project into the enlarged portion 50 of the channel 41 by a spring 51. Upward and downward movement of the finger around its pivotal center is limited by means of a fixed pin 52 lying within a recess 53 in the finger.

The caps enter into position to be engaged by the fingers and are fed forward by the action of the feed bar through a chute 54 leading from a magazine, not shown, in which the caps are stored. An overhanging lip 55 is provided at the point of juncture of the chute 54 and enlarged portion 50 of the T-shaped channel 41, the overhanging lip insuring the correct positioning of the cap within the enlarged portion 50 of the slot after its passage out of the chute. The initial feed member for feeding the cap forward in the enlarged portion 50 of the channel 41 is in the form of a plate 56, best shown in Figs. 4, 5 and 6. This plate 56 is provided for the purpose of preventing the entrance of more than one cap at a time from the chute into the enlarged portion 50, for when the plate 56 is withdrawn, as shown in Fig. 5, space will be provided for a single cap to descend from the chute 54 into the position within the enlarged portion 50, shown in Fig. 7.

As the feed mechanism is actuated and the bar 56 is thrown into the position shown in Fig. 4, the cap deposited from the chute 54 will be carried into position to be engaged by the fingers 47 and carried forward through the enlarged portion 50 of the channel 41; but when the plate 56 is thrown into the position shown in Fig. 4, or while it is being advanced or returned to or from said position, said plate will act as a guard to close the mouth of the chute 54 and prevent any more of the caps from entering into the enlarged portion 50 until the plate has been returned into the position shown in Fig. 5. Thus the feeding of one cap at a time from the chute into position to be acted upon by the feed bar will result.

The feed bar is actuated with a reciprocating movement, whereby an intermittent feed is imparted to the cap in a rectilinear line of travel. The feed bar is actuated from a cam 57 driven by the main driving shaft 36. The cam engages with a roller 58 on a pivoted bar 59, and the bar is connected by a link 60 to ears 61 depending from the body portion of the feed bar, this mechanism being more clearly shown in Fig. 2. The ears to which the link 62 is connected are formed as a portion of a casting 63, best shown in Fig. 9, which casting is provided with a slot 64 for the reception of a feed bar, and is further provided with a lug 65, to which is connected a rod for operating the mechanism for discharging the gasket from the hopper, which mechanism will be more fully hereinafter described. It is understood that although the plate 56 has been described separately, this plate forms in effect an integral portion of the feed bar and is merely one of the feed members carried by the feed bar, which is of a slightly different formation from the balance of the feed members, namely, the fingers 47.

The casting 63 operates in a slot 66 formed in the upper bed-plate 32, best shown in Fig. 8. Located within the enlarged portion 50 of the channel 41 are rails 67 extending longitudinally along either side thereof; and secured to these rails are plates 68, which are of a width to slightly project beyond the rails 67 and form lips to prevent the movement upward and outward of the caps from the enlarged portion 50 during their travel therethrough. As shown more clearly in Fig. 8, the body of the cap lies within the enlarged portion 50 of the channel 41 and rests upon the face of the bottom wall of said slot; and as also shown in Fig. 8, as well as Fig. 10, the acting end 49 of the finger 47 is normally held in position to project into the enlarged portion 50, whereby a movement in the direction indicated by the arrow in Fig. 10 will cause the acting end of the fingers to engage the caps and feed them along the enlarged portion 50 of the channel 41 a distance equal to the movement of the feed bar in that direction. But when the movement of the feed bar in the reverse direction takes place, the acting ends of the fingers 49 will pass beneath the caps without imparting movement thereto.

Means are provided for preventing the movement of the caps with the feed bar during the return movement of the latter. These means are more clearly shown in Fig. 27, and consist of a button 68$^a$ lying within a recess 68$^b$ formed in the bed-plate 32, and said button is held normally projected into said slot by means of a spring 68$^c$; hence, movement will only be imparted to the cap by the actuation of the feed bar in one direction, the cap remaining in its advanced position while the feed bar is returning to normal position. Thus the cap is fed through the enlarged portion 50 with an intermittent movement.

A magazine 69 for the gaskets 70, employed with the seal of the present invention, is mounted in position to overlie centrally the enlarged portion 50 of the channel 41 and is held in position by suitable fastening means 71 attached to plates 72 fixedly secured to the frame of the machine, the method of securing the magazine being best shown in Fig. 1. Underlying the magazine 70 and traveling within a groove 73 in the plate 72 is a finger 74, one end of which is provided with a recess 75 of a size and form to receive one of the gaskets 70, which recess terminates in a reduced counterbore 76, which permits of the insertion of the end of a plunger through the opening in the gasket 70, as will be more fully hereinafter explained. The opposite end of the finger 74 is formed with an upwardly projecting lug 77, in which is mounted one end of a rod 78, said rod having positioned thereon a pair of collars 79 and 80, each adjustable longitudinally of the rod. Traveling upon the rod and interposed between the collars 79 and 80 is the lug 65 of the casting 63, heretofore described and more clearly shown in Fig. 9. By utilizing the construction embodying the collars 79 and 80, a lost-motion connection is effected between the feed bar 43 and the finger 74. Said finger 74 and its component parts form what is hereinafter termed the discharging mechanism for the gaskets.

The operation of the portion of the device above described is as follows: Taking the parts as shown in Fig. 10, when the feed bar is moved in the direction of the arrow shown in said figure, just prior to the end of the movement of the feed bar in this direction, the lug 65 will engage with the collar 79 and move the rod 78 in the direction of travel of the feed bar. This will effect a movement of the finger 74 and will carry the gasket contained within the recess 75 of said finger into the position shown in Fig. 11, and the finger containing the gasket will remain in this position until the feed bar has traveled sufficient distance in the opposite direction from that indicated by the arrows in Fig. 10 to have the lug 65 engage the collar 80, after which engagement the collar will be moved in the direction of travel of the feed bar and into the position shown in Fig. 10. Thus, it will be seen that the finger having a gasket thereon will remain in the position shown in Fig. 11, during the period while the feed bar is traveling backward, a distance equal to the distance between the rear edge of the lug 65 and the front face of the collar 80.

Means are provided for removing the gasket from its position within the recess 75 in the finger 74 and positioning it within the cap. Said means, as shown more clearly in Figs. 10 and 11, comprises a head 81 slidably mounted within a sleeve 82 and held normally projected outward from said sleeve by a spring 83, said outward movement being limited by means of a cotter pin 84, or other suitable contrivance. The sleeve 82 is carried by a lug 85 attached to a sliding bar 86, which travels within a grooved standard 87, more clearly shown in Fig. 1. The bar 86 is connected to a rod 88, upon the lower end of which is mounted a roller 89 traveling upon a cam 90, mounted upon the main drive shaft 36; and the rod 88 is held normally projected downward by means of a coil spring 91, this latter mechanism being best shown in Fig. 2.

As shown in Fig. 28, the cam 90 comprises two cammed surfaces 92 and 93, separated from one another by a portion 94, which in fact is part of the arcuate periphery of the disk forming the cam. Thus, as the periphery of the disk travels beneath the roller, a double movement is given to the rod 88 during a single revolution of the shaft 36, the duration of movement of the rod when engaged by the cammed surface 92 being relatively short with respect to the duration of movement of the rod when the roller is engaged by the surface 93; and the degree of movement imparted to the rod when the roller is engaged by the surface 92 is relatively small compared with the movement imparted to the rod when the roller engages the surface 93. This peculiar formation of cam is necessitated to give the required movement to the lug 85 to remove the gasket from the end of the finger 75 and position it within the cap.

The operation of the portion of the device just described is as follows: When the roller 89 engages the surface 92, sufficient movement will be imparted to the lug 85 to carry the head 81 into the position shown in Fig. 11, where the tapered end 95 of the head 81 projects through the hole 76 in the finger 74; and the body portion of the head is projected through the opening in one of the gaskets 70, whereby the gasket is positioned upon the body portion of said head. After this movement which takes place while the roller is traveling over the surface 92 of the cam, the lug 85, together with the head 81, is returned to normal position, that is, the position shown in Fig. 12, by the movement of the rod imparted to it by the traveling of the roller over the surface 94 of the cam. Immediately after being returned to normal position, the rod is again lowered by the engagement of the roller with the surface 93 of the cam, this latter engagement of the roller serving to actuate the rod sufficiently to depress the lug 85 and insert the head 81 into position within the cap lying below said head. The member 85 continues in its downward movement and the sleeve 82 serves to strip the gasket off from the head 81 and position it within the cap, as shown in Fig. 10, since, of course, movement of the head is checked when the lower end thereof shall have engaged the bottom wall of the cap, and the sleeve is enabled to slide by the head owing to the spring connection between the head and sleeve. When the gasket is stripped from the head by the action of the sleeve 82, the gasket will be forced off from the body portion of the head and will lie in a position where it will surround the tapered end 95 of the head. Thus, as the lug 85 and its component parts are moved back to normal position, the gasket will remain within the cap, since the body portion of the head 81 will never be brought into engagement with the gasket after the gasket has been stripped therefrom, but the gasket will continue to lie in a position where it will surround the reduced end 95 of the head. Thus, no engagement of the gasket with the head will be effected after the gasket has been once stripped from the head and deposited within the cap, and the movement of the head out from the cap will not carry the gasket along with it; hence the gasket will remain in position within the cap.

The movement of the mechanism for discharging the gasket from the magazine and the placing of the discharged gasket within the cap with relation to the movement of the feed bar is as follows: As the feed bar nearly completes its stroke to bring the parts into the position shown in Fig. 11, the finger 74 is moved to carry one of the gaskets out from the magazine and into alinement with the movement of the head 81. The minute the gasket has assumed this position, the head 81 starts on its downward movement and the gasket is placed upon said head; the head is returned to normal position; and immediately when the head has cleared the finger 74, said finger starts upon its return movement, which occurs prior to the finishing of the stroke of the feed bar, to bring the parts into the position shown in Fig. 10. Immediately after the head has been returned to normal position, it again starts upon its downward movement, and this time it is carried far enough down to position the gasket within the cap, as shown in Fig. 10. All of these movements of the head 81 occur during the period while the cap is at rest, that is, during the backward movement of the feed bar. Thus, during the feed of the cap, the gasket is discharged from the magazine, and during the period of rest of the cap, the gasket is transferred from the discharging member onto a receiving member, and from the receiving member is placed in the cap. After receiving the gasket, the cap is fed into position in alinement with a plunger 96, which is hollow and provides a reservoir 97 for containing suitable acid. The plunger 96 is carried by a bracket 98 attached to a rod 99, which is guided in its movements by a sleeve 100. The rod 99 is bifurcated at its lower end to straddle the shaft 36, and also carries at its lower end a roller 101 traveling upon the surface of the cam 102 secured to the main drive shaft 36. As the shaft 36 revolves, the cam serves to actuate the rod 99 to raise and lower the plunger 96, the lowering of the plunger bringing the end 103 thereof into position within the cap and through the opening in the center of the gasket, whereby acid discharged from the lower end of the plunger is placed upon the surface of the cap exposed by the hole in the gasket. The cap with the gasket in place therein and the acid applied thereto is then fed forward into mechanism for forming, placing and securing a retainer for the gasket within the cap. This mechanism consists of a table 104, which is connected to a shaft 105 intermittently actuated by means of the engagement of a cam 106 with rollers 107 carried by a disk 108 secured to the lower end of said shaft. This construction is best illustrated in Fig. 2, and results in an intermittent rotation being imparted to the shaft 105 by the continual rotation of the shaft 36. The table 104 supports a plurality of heads 109, and each of said heads has positioned therein a cylindrical die member 110 secured in position by means of a bolt 111, best shown in Fig. 16. The lower ends 112 of the die members 110 are of a configuration to provide a die surface which acts to form the retainers into the desired configuration when said retainers are placed upon the ends of said die members.

The mechanism for cutting out the blanks from which the retainers are formed is best shown in Figs. 14, 20 and 21, and comprises a sliding head 113 operated by a rod 114 connected to an eccentric 115 upon the shaft 36; and the head is connected to a slidable member 116, to which is also attached a boss 117 carrying the rod 114, this latter construction being more clearly shown in Fig. 2. Attached to the head 113 is an arm 118, to which is attached a link 119 connected to a bell crank lever 120, loosely mounted upon a shaft 121, upon which is mounted a feed roll 122, said feed roll, as more clearly shown in Fig. 20, being provided with knurled surfaces 123. The feed roll is actuated by means of a ratchet 124 fixedly secured to the shaft 121 and operated by the engagement of a pawl 125 carried by the bell crank lever 120. Secured to the bell crank lever is a bar 126 connected to a crank arm 127 loosely mounted upon a shaft 128, upon which shaft is also loosely mounted a feed roll 129 similar to the feed roll 122. Fixedly secured to the shaft 128 is a ratchet 130, which is operated by the engagement therewith of a pawl 131 carried by the crank arm 127. The metal is fed from a reel 132 and is maintained in engagement with the feed rolls 122 and 129 by means of suitable spring pressed idlers 133.

The action of the portion of the mechanism above described is as follows: As the head 113 is moved up and down by the actuation of the eccentric 115, the link 119 is raised and lowered, rocking the bell crank lever 120 about the shaft 121, imparting a reciprocating motion to the bar 126, and simultaneously rocking the crank arm 127 about the shaft 128. Thus the pawls 125 and 131 are brought into acting engagement with the ratchets 124 and 130 respectively during the movement of the head 113 in one direction; and by this engagement of the pawls, the feed rolls 122 and 129 are operated a predetermined distance in one direction. Thus an intermittent feeding of the strip of metal is produced. The metal lying between the feed rolls passes between a fixed upper plate 134 and a fixed lower plate 135, this construction being best shown in Fig. 23. The lower plate is provided with an opening 136 and the upper plate is provided with an opening 137, in which is positioned a female cutting die member 138 for cutting from the strip of metal the blanks from which the retainers are formed. The male cutting die member is in the form of a plunger head 139, which is carried by the head 113, and the heads 109 on the table 114 are so positioned that one of the die members 110 will be positioned in alinement with the openings 136 and 137, and, as heretofore described, the lower face of the die member 110 is of a configuration to form one of the die members for forming the retainer.

The upper end of the plunger 139 is provided with a spring pressed plug 140, which in normal position lies flush with the top edge of the plunger 139. When, however, the blank for the retainer has been brought into engagement with the lower end of the die member 110, the plug 140 will be depressed sufficiently so that a portion of the blank for the retainer will be forced into the interior of the plunger 139 and the desired configuration given to the retainer 141, which retainer comprises a flanged portion 142 and a countersunk central portion 143.

The operation of the above described portion of the device is as follows: As the head 113 is moved upward, the plunger 139 will pass through the opening 136 and the outer edges of the plunger 139 will act as a male die member in conjunction with the inner edges of the female die member 138 to sever from the strip of metal a disk-shaped blank from which the retainer is formed. This disk-shaped blank will be carried upward by the plunger 139 and brought into engagement with the die face on the lower end of the die member 110, which engagement will result in the forming of the blank into a retainer comprising a flanged periphery and a countersunk body portion. The spring pressed nature of the plug 140 will insure the stripping of the formed retainer off from the end of the plunger 139 when said plunger is withdrawn to lowered position. As shown in Fig. 16, each of the die members 110 is provided with a bore 144 extending from end to end thereof. The nut 111 which carries the die member in place within the head 109 is provided with a bore or passage 145 communicating with the passage 144, and connected to the nut 111 is a bored nipple 146, to which is attached a pipe 147, the other end of which is attached to a bored nipple 148 in communication with the interior of a valve casing 149. This casing is attached to and revoluble with the shaft 105.

Located within the casing 149 is a valve plug 150 having a chambered interior 151, with which communicates a pipe 152 leading from a suitable source of suction. The plug 150 is provided with a supply duct 153 and with an exhaust duct 154. As shown in Fig. 14, one of the tubes 147 leads from each of the heads 109, and the suction system is utilized for the purpose of maintaining the formed retainer upon the end of the die member 110 until the cap with the gasket positioned therein is placed upon the said die member.

The operation of the portion of the device last described is as follows: When the plunger 139 acts to place the retainer upon the end of the die member 110, the tube 147 connected to that die member receiving the retainer is in position whereby a suction is created therein through the inlet port 153 of the valve member 150. This inlet port is in the form of an elongated groove, whereby the suction is maintained within said die member for a predetermined period of movement of the die member, upon which the retainer is placed. After such period of movement has been completed, the suction is broken through the registration of the nipple, upon which the tube connected to this particular die member is mounted, with the exhaust port 154. However, before this suction is broken, the cap with the gasket therein will have been brought into position upon the end of this die member, whereby the cap will serve thereafter to maintain the retainer in position upon the head. But during the interval of movement of the table carrying the heads 109 between the point where the retainer is formed and placed upon the die members 110 and the gasket bearing caps placed upon said die member, the retainer will be held in position upon the die member by means of the suction heretofore described.

To properly effect the securance of the retainer within the body of the cap, it is necessary to provide means to firmly position the gasket bearing cap upon the heads carrying the retainers; and the mechanism for performing this part of the work is more clearly shown in Figs. 15, 16, 17 and 18, and is as follows: Pivoted between ears 155 carried by the table 104 are arms 156, one of said arms being provided for each of the heads carrying the die members 110; but since the construction and operation of all of these arms are exactly similar, it is not deemed necessary to describe the construction and operation of more than one of them. Each of the arms is of a forked formation at its outer end to provide an opening 157, and the opening is of a size to receive the countersunk body portion of the cap, the flanges of the cap resting against the metal surrounding the opening, as indicated by the dotted lines in Fig. 15.

As shown in the drawings, the slotted end of the arms is a separate piece from the body portion of the arm, but this feature, of course, is a detail of construction and could be changed to suit the idea of the mechanic building the machine. The arm is pivoted at 158 by means of a suitable pin passing through the ears 155, and the inner end of the arm is provided with a roller 159 which travels between an upper plate 160 and a lower plate 161, both of which are held against rotation with respect to the shaft 105. The surfaces of the plates 160 and 161, which are engaged by the roller 159, are of a cammed formation, the functions of which will be more fully hereinafter set forth.

The operation of the portion of the device just described is as follows: The arms 156, which may be termed clamping members, are so positioned that one of them will be at rest in alinement with the feed bar when the feed bar is operating to feed the caps. The last finger on the feed bar will serve to force the cap up onto the clamping member positioned in alinement with the feed bar, the relation of the clamping member to the feed bar being more clearly shown in Fig. 17. The rim of the cap will engage the upper face of the clamping member and serves to guide the cap so that it will position itself upon the clamping member, the countersunk body portion of the clamping member entering into the recess in the forked end of the clamping member.

As shown in Fig. 17, when the cap is initially placed upon the clamping member, said clamping member will be in non-acting position with respect to the head carrying the retainer. After the cap has been positioned upon the clamping member, the table 104 is rotated and the clamping member with the cap in position thereon is carried forward. In order to insure against the slippage of the cap out from its position upon the clamping member during the initial movement of the clamping member carrying the cap, a wall 162 is provided, which engages the outer end of the cap and holds it in the desired position upon the clamping member. After the table has been rotated a predetermined distance, the clamping member is thrown into the engaging position indicated at the left hand side of Fig. 16, which position brings the cap with the gasket therein into firm engagement with the die member carrying the retainer, whereby the retainer is firmly positioned in the interior of the cap in desired relation to the gasket. This clamping position is maintained by the clamping members 156 for a predetermined period of revolution of the table 104. During the revolution of the table heat is applied to the cap by means of a series of burners 163 extending from an arcuate-shaped pipe 164, the burners 163 being in alinement with the line of travel of the caps carried by the clamping members 156, and are so positioned as to underlie the exposed countersunk portions of the cap during the periods while the table 104 is at rest. Thus, heat is applied to the cap at various intervals during the travel of the caps upon the die members 110, and the caps are maintained in the clamped position heretofore described during such application of heat.

The material from which the retainers are formed is a metal having a coating of fusible material thereon. Hence, when heat is applied, the fusible surface of the retainers will melt and adhere the retainer to the interior of the cap, acid having been placed upon the point where this fusion will take place as described in that portion of the operation pertaining to the positioning of the gasket within the cap. The cap, with the retainer positioned therein, will be carried a predetermined distance after this heating operation, and the cammed surfaces of the plates 160 and 161 will operate to release the arm 156 from clamping position and into the position shown to the right of Fig. 16, after which an ejector 165 operated by the head 113 will serve to kick the cap out from the position upon the clamping member and into any desired receptacle.

Means are provided for moving the burners out from position in the line of travel of the caps, said mechanism comprising a rod 166, which is connected by a link 167 to the clutch mechanism 40. The rod 166 is operated by a handle 168, whereby the revolution of the rod by the swinging of the handle will throw the link 167 to break the clutch connection to the driving mechanism. At the opposite end of the rod is a link 169 which is connected to an arm 170 pivotally secured to a bracket 171. The upper end of the arm 170 is connected to a plate 172, which is slidably mounted upon a fixed plate 173. By this construction, when the rod 166 is rocked to throw the clutch mechanism out of engagement, the link 169 is swung to actuate the arm 170 and slide the plate 172, which carries the pipe 164, whereby the pipe is moved outward from the center of the shaft 105, and therefore out of the path of travel of the caps carried by the die members 110.

By the above arrangement, whenever the operation of the machine is stopped by the throwing out of the clutch gearing, the heating mechanism is simultaneously thrown out of active operation, and thus the danger of a continued heat being applied to the caps during a long period of rest of the machine is obviated, as is also the necessity of cutting off the supply of heat by the operator each time the machine is stopped. The relation of the periods of rest and the periods of movement of the several parts is as follows: The period of movement of the table 104 is during the period of rest of the cap being fed by the feed bar. The period of movement of the mechanism for forming and placing the retainer upon the head and for ejecting the completed cap from the clamping member, as well as the mechanism for centering the table 104, occurs during the period of rest of the table 104.

The mechanism for effecting the centering of the table 104 is as follows: Interposed between the heads 109 are a series of heads 174. Each of these heads, as shown, depends downwardly from the table and is provided with a recess 175. These recesses are adapted to receive the end of a pilot-pin 176 carried by a block 177 attached to the head 113. It will be noted that the mechanism for forming and placing the retainer, the mechanism for centering the table 104, and the mechanism for ejecting the cap from the clamping member, are all carried and operated by the movements of the slidable member 116.

The operation of the entire machine will be understood from the foregoing, but briefly is as follows: The caps are fed through the actuations of the feed bar 43 into position to receive the gaskets discharged from the magazine 69. After the gaskets have been positioned within the cap, acid is placed in the cap on the portion exposed by the hole in the center of the gasket. The cap is then fed forward into position to be received by the clamping members 156. Prior to the reception of the caps by the clamping members, a retainer has been formed and placed upon the die carried by the heads 109, and said retainer is held in position upon said heads, prior to the positioning of the cap thereon, by means of suction. When the head with the retainer is brought into proper position, the cap with the gasket thereon is fed onto the clamping member and the clamping member actuated to bring the gasket bearing cap into firm and accurate position with respect to the retainer carried upon the head. Then the table 104 continues in its revolution, and during such revolution the clamping member is actuated to hold the gasket bearing cap in its clamped position upon the head carrying the retainer, and during such engagement heat is applied to the cap, whereby the fusible surface of the retainer is melted and the retainer fixed within the body of the cap. After this has been accomplished, the clamping member is released from its engaged position and the cap is ejected from its position upon the clamping member through the actuation of the ejecting member 165. While the table 104 is at rest, the head 113 will be actuated to raise the plunger 139, which cuts the blank from the retainer out from the body of the metal, as well as carries the blank upon the die 110 to form the same, and at this same operation the pilot-pin 176 will be advanced to engage with the recess in the heads 174, whereby a centering of the table 104 will be effected during each period of rest thereof; and at the same time that the cutting and forming of the retainer occurs, the ejector 165 will be operated to discharge the completed cap from its position upon the clamping member.

I claim:

1. In a machine of the class described, the combination of means for feeding a cap forward in a rectilinear path of travel, means for placing a gasket within said cap during said feeding operation, mechanism for receiving the cap after it has reached its limit of rectilinear travel, mechanism operatively connected for actuating said receiving mechanism with a rotary movement, and means for placing and securing a retainer within said cap while it is being conveyed by the receiving member, substantially as described.

2. In a machine of the class described, the combination of means for feeding a cap forward in a rectilinear path of travel with an intermittent movement, means for placing a gasket within said cap during said feeding operation, rotative mechanism for receiving the cap after it has reached its limit of rectilinear travel, mechanism for operating said receiving member with an intermittent movement, the periods of rotative movement of the feeding and receiving mechanisms alternating, and means for placing and securing a retainer for the gasket within the cap during the conveyance of the cap upon the receiving member, substantially as described.

3. In a machine of the class described, the combination of a carrier provided with a plurality of members adapted to receive caps having gaskets therein, mechanism operatively connected for imparting movement to said carrier, means for feeding said caps into position to be placed upon said members, means for placing and holding the caps in position upon said members, means for forming and placing a retainer for the gaskets upon said members prior to the placing of the caps thereon, and means for securing the retainer to the caps during their conveyance by said members, substantially as described.

4. In a machine of the class described, the combination of a carrier provided with a plurality of members adapted to receive caps having gaskets therein, mechanism operatively connected for imparting movement to said carrier, means for feeding said caps into position to be placed upon said members, means for placing and holding the caps in position upon said members, means for forming and placing a retainer for the gaskets upon said members prior to the placing of the caps thereon, and means for applying heat to said caps during their conveyance by said members, whereby the retainers are secured in place within the caps, substantially as described.

5. In a machine of the class described, the combination of a bed-plate provided with a horizontally extending T-shaped slot, a feed bar extending practically the entire length of the slot, the widened portion of said slot serving as a passageway for caps, the contracted portion of said slot serving as a guideway for the feed bar, and members overhanging the widened portion of the slot and serving to prevent displacement of the caps therefrom during the feeding operation, substantially as described.

6. In a machine of the class described, the combination of reciprocating mechanism for feeding caps, a magazine for gaskets, a gasket discharging member, a lost-motion connection between the discharging member and the feed mechanism, whereby said discharging member is operated toward the end of movement of the feed mechanism in either direction, a plunger adapted to receive the gaskets from the discharging member, the movement of the discharging member in one direction carrying a gasket into position in alinement with the plunger, and mechanism operatively connected for actuating the plunger to remove the gasket from the discharging member and place it within a cap, substantially as described.

7. In a machine of the class described, the combination of a reciprocating feed bar, a magazine for gaskets, a discharging member for the gaskets, a lug on the discharging member, a rod carried by the lug, collars upon the rod, a lug carried by the feed bar slidably mounted on the rod and interposed between the collars, whereby movement is imparted to the rod by the actuations of the feed bar, and whereby a lost-motion is produced in the movements of the rod with respect to the movements of the feed bar, the movement of the rod in one direction actuating the discharging mechanism to carry a gasket out of position from within the magazine, and means for removing the gasket from the discharging member and placing it within a cap, substantially as described.

8. In a machine of the class described, the combination of mechanism for feeding caps with an intermittent movement, a magazine for gaskets each gasket being formed with a central opening therein, a plunger, mechanism for transferring a cap from the magazine into position to be received by the plunger, said plunger comprising a sleeve, a head of uniform size slidably within the sleeve, said head terminating in a beveled end of smaller diameter than the opening in the cap, means for initially depressing the plunger to force the plunger through the opening in the gasket and place the gasket upon the body portion of the head, then further depressing the plunger to place the gasket within the cap, then returning the plunger to normal position, the engagement of the head with the face of the cap telescoping the head within the sleeve, the lower face of the sleeve serving to strip the gasket from the head and place it within the cap, the beveled end of the head permitting the retraction of the head from the cap without removing the gasket therefrom, substantially as described.

9. In a machine of the class described, the combination of mechanism for feeding caps, means for placing a ring-shaped gasket within a cap, means for placing acid on the portion of the cap exposed through the opening in the gasket, and means for placing and securing a metallic retainer within the cap, substantially as described.

10. In a machine of the class described, the combination of mechanism for feeding caps with an intermittent movement, means for placing a ring-shaped gasket within a cap, a chambered plunger forming a reservoir for acid, means at the lower end of the plunger for restricting the outflow of acid from the reservoir, and means operatively connected for imparting a reciprocating movement to the plunger, whereby acid is placed on the portion of the cap exposed by the opening in the gasket by the contacting of the end of the plunger with the interior of the cap, substantially as described 11. In a machine of the class described, the combination of means for placing gaskets within caps, means for placing retainers for the gaskets within the caps, said latter means comprising a movable carrier provided with a plurality of members adapted to receive the caps, means for placing a retainer on said members prior to the placing of the caps thereon, means for maintaining said caps in close engagement with said retainer bearing members during a period of movement of said carrier, means for applying heat to said caps during their conveyance by said carrier, whereby the retainers are secured within the caps, substantially as described.

12. In a machine of the class described, the combination of means for placing gaskets within caps, means for placing retainers for the gaskets within the caps, said latter means comprising a movable carrier provided with a plurality of members adapted to receive the caps, means for placing a retainer on said members prior to the placing of the caps thereon, means for maintaining said caps in close engagement with said retainer bearing members during a period of movement of said carrier, means for applying heat to said caps during their conveyance by said carrier, whereby the retainers are secured within the caps, and means for automatically removing the caps from said members, substantialy as described.

13. In a machine of the class described, the combination of means for placing gaskets within caps, means for placing retainers for the gaskets within the caps, said latter means comprising an intermittently movable carrier provided with a plurality of members adapted to receive the caps, means for placing a retainer on said members prior to the placing of the caps thereon, means for maintaining said caps in close engagement with said retainer bearing members during a period of movement of said carrier, means for applying heat to said caps during their conveyance by said carrier, whereby the retainers are secured within the caps, and means for centering said carrier after each movement thereof, substantially as described.

14. In a machine of the class described, the combination of means for placing gaskets within caps, means for placing retainers for the gaskets within the caps, said latter means comprising a movable carrier and a plurality of members on said carrier adapted to receive the caps, means operatively connected for moving said carrier with an intermittent movement, means for placing retainers on said members prior to the placing of the gasket bearing caps thereon, means for maintaining said gasket bearing caps in close engagement with said retainer bearing members during a period of movement of said carrier, and means for applying heat to the caps during the periods of rest of said carrier, substantially as described.

15. In a machine of the class described, the combination of means for placing gaskets within caps, a movable carrier, a plurality of members mounted on said carrier, adapted to receive the gasket bearing caps, means for placing retainers for the gaskets upon said members prior to the placing of the gasket bearing caps thereon, a movable clamping member below each retainer carrying member adapted to be actuated to hold a cap in firm engagement with said retainer carrying member, means for maintaining said clamping members in engaged position with the gasket bearing caps during a period of movement of the carrier, means for applying heat to the caps during their conveyance by the retainer carrying members, whereby the retainers are secured to the caps, and means for releasing the clamping members from engagement with the caps, substantially as described.

16. In a machine of the class described, the combination of means for placing gaskets within caps, a movable carrier, a plurality of members mounted on said carrier, adapted to receive the gasket bearing caps, means for placing retainers for the gaskets upon said members prior to the placing of the gasket bearing caps thereon, a movable clamping member below each retainer carrying member adapted to be actuated to hold a cap in firm engagement with said retainer carrying member, means for maintaining said clamping members in engaged position with the gasket bearing caps during a period of movement of the carrier, means for applying heat to the caps during their conveyance by the retainer carrying members, whereby the retainers are secured to the caps, means for releasing the clamping members from engagement with the caps, and means for automatically ejecting the caps from the members, substantially as described.

17. In a machine of the class described, the combination of mechanism for positioning gaskets within caps, a movable carrier, a plurality of members on said carrier, adapted to receive the gasket bearing caps, means for rotating said carrier with an intermittent movement, means for securing retainers within the caps during their conveyance by the members on said carrier, means for centering said carrier after each movement thereof, comprising a pin, mechanism operatively connected for reciprocating said pin during the periods of rest of said carrier, said carrier being provided with recesses located intermediate said cap bearing members, adapted to receive said pin, substantially as described.

18. In a machine of the class described, the combination of means for placing gaskets within caps, a movable carrier, a plurality of members mounted upon said carrier, adapted to receive the gasket bearing caps, means for placing retainers upon said members prior to the placing of the caps thereon, a movable clamping member, having a recess therein, underlying each of said members, means for maintaining said clamping member in engaged position with said caps during a period of movement of said carrier, whereby the retaining members are firmly positioned within the interior of said caps, and means for applying heat to that portion of the caps exposed through the recesses in the clamping members, whereby the retainers are adhered to the interior of the caps, substantially as described.

19. In a machine of the class described, the combination of mechanism for placing gaskets within caps, a series of heads, a movable carriage upon which the heads are mounted, means for placing a retainer for the gaskets upon said heads, means for placing the gasket bearing caps upon said heads after the placing of the retainers thereon, means for securing the gasket bearing caps upon said heads, comprising a plurality of movable arms, provided with forked ends, whereby a portion of said caps project through the arms during the clamping operation, and means for applying heat to the projecting portion of said caps, whereby the retainers are secured within said caps, substantially as described.

20. In a machine of the class described, the combination of mechanism for placing gaskets within caps, a movable carrier, a plurality of members supported by said carrier for placing the retainers for said gaskets within the said caps, and adapted to receive said assembled caps, means for maintaining said caps in position upon said members, comprising movable clamping members positioned below said cap bearing members, a roller upon each of said clamping members, plates between which said rollers travel, said plates being provided with cammed surfaces adapted to act to throw the clamping members to carry the caps into and out of engaging position with the cap bearing members, and means for applying heat to the cap during its period of engagement upon said cap bearing members, whereby the retainer is affixed within said cap, substantially as described.

21. In a machine of the class described, the combination of mechanism for placing gaskets within caps, a rotatable table, mechanism for rotating the same, a plurality of members carried by said table, adapted to receive said partially assembled caps and to place a retainer for said gaskets within said caps, a clamping member below each of said cap carrying members pivotally mounted between ears carried by said table, a roller upon each of said clamping members, fixed circular plates between which said rollers travel, said plates being provided with cammed surfaces which act to move said clamping members into position to rigidly secure said caps in position upon said cap carrying members, then maintaining said caps in secured position upon said carrying members during a period of movement of said table, then releasing said clamping members from engaging position with the caps, and means for applying heat to said caps during their conveyance by said table, whereby the retainers are secured within the caps, substantially as described.

22. In a machine of the class described, the combination of mechanism for placing gaskets within caps, a rotatable table, a plurality of members carried by said table, adapted to receive said partially assembled caps and to place a retainer for said gaskets within said caps, means for operating said table with an intermittent movement, clamping members for securing said caps in rigid position upon said cap carrying members, said clamping members consisting of an arm below each of said cap carrying members, each of said arms being provided with a recess through which a portion of the caps projects, a roller upon the end of each of said arms, fixed plates between which the rollers travel, said plates being provided with cammed surfaces adapted to actuate the clamping members to bring them into engagement with the caps on the cap carrying members, then maintaining said caps in engaged position while the table is advanced a period of revolution, then releasing the locking member from engaging position with the caps, an arcuate-shaped pipe located in the line of travel of the exposed portions of the caps, a plurality of burners projecting from said pipe, each of said burners being positioned to underlie a cap while said cap is at rest during its conveyance by said cap carrying members, whereby the caps are heated and the retainers secured within the caps, substantially as described.

23. In a machine of the class described, the combination of mechanism for placing gaskets within caps, a rotatable table, a plurality of members carried by said table, adapted to receive said partially assembled caps and to place a retainer for said gaskets within said caps, means for operating said table with an intermittent movement, clamping members for securing said caps in rigid position upon said cap carrying members, said clamping members consisting of an arm below each of said cap carrying members, each of said arms being provided with a recess through which a portion of the caps projects, a roller upon the end of each of said arms, fixed plates between which the rollers travel, said plates being provided with cammed surfaces adapted to actuate the clamping members to bring them into engagement with the caps on the cap carrying members, then maintaining said caps in engaged position while the table is advanced a period of revolution, then releasing the locking member from engaging position with the caps, an arcuate-shaped pipe located in the line of travel of the exposed portions of the caps, a plurality of burners projecting from said pipe, each of said burners being positioned to underlie a cap while said cap is at rest during its conveyance by said cap carrying members, whereby the caps are heated and the retainers secured within the caps, and means for automatically ejecting the caps from the clamping members, substantially as described.

24. In a machine of the class described, the combination of mechanism for placing gaskets within caps, a rotatable table, a plurality of members carried by said table, adapted to receive said partially assembled caps and to place said gaskets within said caps, means for operating said table with an intermittent movement, clamping members for securing said caps in rigid position upon said cap carrying members, said clamping members consisting of an arm below each of said cap carrying members, each of said arms being provided with a recess through which a portion of the caps projects, a roller upon the end of each of said arms, fixed plates between which the rollers travel, said plates being provided with cammed surfaces adapted to actuate the clamping members to bring them into engagement with the caps on the cap carrying members, then maintaining said caps in engaged position while the table is advanced a portion of a revolution, then releasing the locking member from engaging position with the caps, an arcuate-shaped pipe located in the line of travel of the exposed portions of the caps, a plurality of burners projecting from said pipe, each of said burners being positioned to underlie a cap while said cap is at rest during its conveyance by said cap carrying members, whereby the caps are heated and the retainers secured within the caps, and means for centering the rotatable member after each movement thereof, substantially as described.

25. In a machine of the class described, the combination of mechanism for placing gaskets within caps, a movable carrier, a plurality of members carried by said carrier, adapted to receive said gasket bearing caps, means for placing a retainer for said caps upon said members prior to the installation of the caps thereon, a clamping member below each of said members, means for operating each of the clamping members to throw them into and out of position whereby the caps are brought into and released from engagement with the cap carrying members, and a member for preventing the slippage of the caps from the clamping members during the interval between the placing of the caps upon the clamping members and the movement of the clamping members to secure the caps in position upon the cap carrying members, substantially as described.

26. In a machine of the class described, the combination of mechanism for positioning gaskets within caps, a movable carrier, a plurality of members upon said carrier, adapted to receive and carry the gasket bearing caps, means for maintaining the caps in position upon said members, means for placing a retainer for the gaskets upon said members prior to the insertion of the gasket bearing caps thereon, and means for holding said retainers in engagement with said members prior to the installation of the caps thereon, substantially as described.

27. In a machine of the class described, the combination of mechanism for positioning gaskets within caps, a movable carrier, a plurality of members upon said carrier, adapted to receive and carry the gasket bearing caps, means for maintaining the caps in position upon said members, means for placing a retainer for the gaskets upon said members prior to the insertion of the gasket bearing caps thereon, and a suction system for holding said retainers in engagement with said members prior to the installation of the caps thereon, substantially as described.

28. In a machine of the class described, the combination of mechanism for positioning gaskets and retainers therefor within caps, a rotatable table, a plurality of members carried by said table, adapted to receive said caps with the gaskets and retainers therein, means for operating said table with an intermittent movement, clamping members for securing said caps in rigid position upon said cap carrying members, said clamping members consisting of an arm below each of said cap carrying members, each of said arms being provided with a recess through which a portion of the caps projects, a roller upon the end of each of said arms, fixed plates between which the rollers travel, said plates being provided with cammed surfaces adapted to actuate the clamping members to bring them into engagement with the caps on the cap carrying members, then maintaining said caps in engaged position while the table is advanced a period of revolution, then releasing the locking member from engaging position with the caps, an arcuate-shaped pipe located in the line of travel of the exposed portions of the caps, a plurality of burners projecting from said pipe, each of said burners being positioned to underlie a cap while said cap is at rest during its conveyance by said cap carrying members, whereby the caps are heated and the retainers secured within the caps, and means for moving the arcuate-shaped pipe to bring the burners out of the path of travel of the cap, substantially as described.

29. In a machine of the class described, the combination of mechanism for positioning gaskets within caps, mechanism for forming and placing retainers for the gaskets within the caps, said mechanism embodying means for feeding a strip of metal, means for cutting blanks from said strip, a movable carrier, a plurality of members upon said carrier, means for forcing the cut-out blanks of metal onto said members, the lower face of said members being in the form of a die surface, whereby the forcing of the blanks onto said members forms the blanks into cup-shaped retainers, means for maintaining said retainers in position upon said members, means for placing said gasket bearing caps in position upon said members, whereby said retainers are firmly positioned within said caps in proper relation to said gaskets, and means for securing said retainers in position within said caps, substantially as described.

30. In a machine of the class described, the combination of mechanism for positioning gaskets within caps, a movable carrier, a plurality of members upon said carrier, adapted to receive said gasket bearing caps, means for intermittently moving said carrier, means for intermittently feeding a strip of metal, the periods of movement of the metal and the carrier coinciding, means for cutting blanks from said metal and positioning them upon said members during the periods of rest of said metal and carrier, the lower face of each of said members being in the form of a die, whereby the placing of the blanks thereon form them into a retainer, means for placing and holding the gasket bearing caps upon the retainer bearing members, and means for subjecting the placed caps to heat, whereby the retainers are affixed within the caps, substaintially as described.

31. In a machine of the class described, the combination of mechanism for positioning gaskets within caps, a movable carrier, a plurality of members upon said carrier, adapted to receive said gasket bearing caps, means for intermittently moving said carrier, means for intermittently feeding a strip of metal, the periods of movement of the metal and the carrier coinciding, means for cutting blanks from said metal and positioning them upon said members during the periods of rest of said metal and carrier, the lower face of each of said members being in the form of a die, whereby the placing of the blanks thereon form them into a retainer, means for placing and holding the gasket bearing caps upon the retainer bearing members, means for subjecting the placed caps to heat, whereby the retainers are affixed within the caps, means for centering the carrier after each operation thereof, the feed mechanism, cutting and forming mechanism, and centering mechanism all being operated from a common power actuated member, substantially as described.

32. In a machine of the class described, the combination of mechanism for positioning gaskets within caps, a movable carrier, a plurality of members upon said carrier, adapted to receive said gasket bearing caps, means for intermittently moving said carrier, means for intermittently feeding a strip of metal, the periods of movement of the metal and the carrier coinciding, means for cutting blanks from said metal and positioning them upon said members during the periods of rest of said metal and carrier, the lower face of each of said members being in the form of a die, whereby the placing of the blanks thereon form them into a retainer, means for placing and holding the gasket bearing caps upon the retainer bearing members, means for subjecting the placed caps to heat, whereby the retainers are affixed within the caps, means for centering the carrier after each operation thereof, means for ejecting the caps with the completed seals therein from the machine, said feeding mechanism, cutting and forming mechanism, centering mechanism, and ejecting mechanism all being operated from a single power actuated member, substantially as described.

33. In a machine of the class described, the combination of mechanism for positioning gaskets within caps, a movable carrier, a plurality of members upon said carrier, adapted to receive said gasket bearing caps, means for intermittently moving said carrier, means for intermittently feeding a strip of metal, the periods of movement of the metal and the carrier coinciding, means for cutting blanks from said metal and positioning them upon said members during the periods of rest of said metal and carrier, the lower face of each of said members being in the form of a die, whereby the placing of the blanks thereon form them into a retainer, means for placing and holding the gasket bearing caps upon the retainer bearing members, means for subjecting the placed caps to heat, whereby the retainers are affixed within the caps, means for centering the carrier after each operation thereof, means for ejecting the caps with the completed seals therein from the machine, a main driving shaft, a slidable head, a cam on the main driving shaft, a connection between the cam and the sliding head, the movements of said sliding head operating the feeding mechanism, cutting and forming mechanism, centering mechanism, and ejecting mechanism, substantially as described.

34. In a machine of the class described, the combination of mechanism for cutting blanks for retainers from a strip of metal, embodying means for intermittently feeding the strip of metal, upper and lower plates between which the metal passes during the feeding operation, an opening in each of said plates in alinement with one another, a plunger, mechanism operatively connected for reciprocating said plunger, the outer edges of the plunger coöperating with the walls of the opening in the upper plate to sever a blank from the metal by the passing of the plunger through said openings, a spring actuated plug in the upper end of the plunger, to permit of the entrance of the lower end of the member receiving the blank thereinto, whereby the blank is formed into a retainer, said spring pressure upon said plug serving to strip the formed retainer from the end of the plunger when the plunger is retracted, substantially as described.

35. In a machine of the class described, the combination of mechanism for intermittently feeding caps, mechanism for placing gaskets within said caps during the periods of rest in the feeding of said caps, a rotatable carrier, adapted to receive said gasket bearing caps, means for intermittently rotating said carrier, the periods of rotation of said carrier alternating with the periods of movement of the caps during the feeding operation, means for cutting and forming a retainer for the gaskets, means for feeding a strip of metal from which the retainers are cut, means for placing the retainers upon the carrier, the feeding of said metal being simultaneous with the movement of the carrier, the cutting and positioning of the retainers upon the carrier being during the period of rest of the carrier, means for securing the retainers within the caps, and means for ejecting the caps with the retainers and gaskets therein, said ejecting operation occurring during the period of rest of the carrier, substantially as described.

CHARLES D. McDONALD.

Witnesses:
EULALIE LIND,
E. U. McDONALD.